(12) United States Patent
Willit et al.

(10) Patent No.: US 10,301,729 B2
(45) Date of Patent: May 28, 2019

(54) INTEGRAL U/TRU RECOVERY CATHODE SYSTEM FOR ELECTROREFINING USED NUCLEAR FUEL, METHOD FOR ELECTROREFINING AND HARVESTING METAL FROM USED NUCLEAR FUEL

(71) Applicants: James L. Willit, Batavia, IL (US); Mark A. Williamson, Naperville, IL (US); Stanley G. Wiedmeyer, Glen Ellyn, IL (US); Magdalena M. Tylka, Willow Springs, IL (US)

(72) Inventors: James L. Willit, Batavia, IL (US); Mark A. Williamson, Naperville, IL (US); Stanley G. Wiedmeyer, Glen Ellyn, IL (US); Magdalena M. Tylka, Willow Springs, IL (US)

(73) Assignee: UCHICAGO ARGONNE, LLC, Chicago, IL (US)

( * ) Notice: Subject to any disclaimer, the term of this patent is extended or adjusted under 35 U.S.C. 154(b) by 180 days.

(21) Appl. No.: 15/143,173

(22) Filed: Apr. 29, 2016

(65) Prior Publication Data

US 2017/0314151 A1 Nov. 2, 2017

(51) Int. Cl.
*C25C 3/34* (2006.01)
*C25C 7/02* (2006.01)
*G21C 19/42* (2006.01)
*G21C 19/48* (2006.01)

(52) U.S. Cl.
CPC ............... *C25C 7/025* (2013.01); *C25C 3/34* (2013.01); *G21C 19/42* (2013.01); *G21C 19/48* (2013.01); *Y02W 30/884* (2015.05)

(58) Field of Classification Search
CPC ................... C25C 3/34; G21C 19/42–19/44; G21C 19/48
USPC ............................ 204/280, 289; 205/43–49
See application file for complete search history.

(56) References Cited

U.S. PATENT DOCUMENTS

| | | | |
|---|---|---|---|
| 3,052,611 A * | 9/1962 | Piper | C25C 3/34 205/47 |
| 6,599,413 B1 * | 7/2003 | Dekeyser | C22C 1/026 204/241 |
| 8,097,142 B2 | 1/2012 | Willet et al. | |

* cited by examiner

*Primary Examiner* — Bryan D. Ripa
*Assistant Examiner* — Ho-Sung Chung
(74) *Attorney, Agent, or Firm* — Cherskov Flaynik & Gurda, LLC

(57) ABSTRACT

The invention provides a system for collecting metal in an electrorefining process, the system having a hollow cathode; and a container defining an upwardly extending surface adapted to be received by the hollow cathode. An embodiment of the invention provides for metal reduction to occur on laterally facing and medially facing surfaces of the cathode such that electrolyte resides between surfaces of the cathode. Also provided is a metal electrorefining process having the steps of subjecting molten salt containing metal moieties to electrolysis wherein reduced metal accumulates in a cathode-cup construct in a first position; raising the construct to a second position above the molten salt while subjecting the construct to heat from the molten salt; withdrawing the cathode from the construct into a vestibule to the electrorefiner to a third position; and removing the cathode and cup from the electrorefiner to a fourth position.

13 Claims, 13 Drawing Sheets

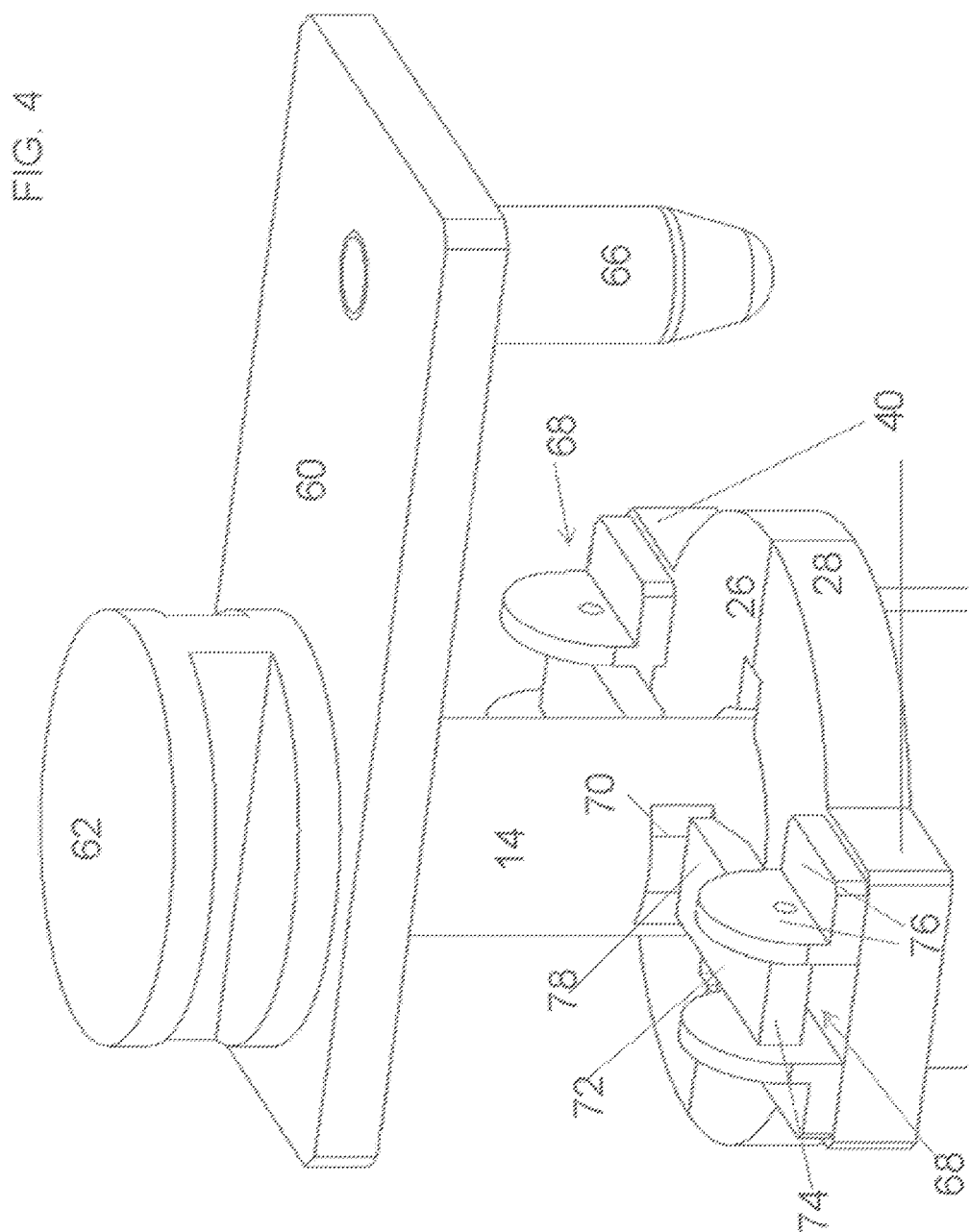

INTEGRAL U/TRU RECOVERY CATHODE SYSTEM FOR ELECTROREFINING USED NUCLEAR FUEL, METHOD FOR ELECTROREFINING AND HARVESTING METAL FROM USED NUCLEAR FUEL

CONTRACTUAL ORIGIN OF THE INVENTION

The U.S. Government has rights in this invention pursuant to Contract No. DE-AC02-06CH11357 between the U.S. Department of Energy and UChicago Argonne, LLC, representing Argonne National Laboratory.

BACKGROUND OF THE INVENTION

1. Field of the Invention

This invention relates to a system and method for harvesting metal from used nuclear fuel and more specifically this invention relates to a system and method for collecting and removing reduced metal from cathodes in electrorefining processes.

2. Background of the Invention

Electrorefining operations require scrupulous control of reaction environment conditions. For example, inert atmospheres are usually required. Also, operating temperatures of between 500 and 650° C. are employed, inasmuch as molten salt electrolyte is required to recover targeted metal product at desired purities. Lastly, harvesting and removal of any metal reduced during the process must be extremely efficient such that the vast majority of the metal is deposited in ingots or other storage containers while the molten salt draining therefrom is still flowing.

Electrorefining is also associated with highly radioactive fission products such as noble metals, active metals and gases, which must be controlled. As such, these processes are typically performed in inert atmosphere hot cells, and manipulated remotely using robots.

A need exists in the art for a method and system for harvesting transuranic metals during electrorefining operations. The method and system should minimize loss of metal during harvesting. The method and system should also maximize collection of reduced metal without exposure of personnel or the environment to the radiation and toxicity normally associated with the metals.

SUMMARY OF INVENTION

An object of the invention is to provide a method and system for harvesting metal (i.e., a co-deposited uranium-transuranic element product) from used nuclear fuel that overcomes many of the drawbacks of the prior art.

Another object of the invention is to provide a system for harvesting reduced metal from an electrorefiner. A feature of the invention is a removable collection cup that reversibly receives a cathode so as to encircle the sides and bottom of the cathode. An advantage of the invention is that the cup collects reduced metal as it is formed at the cathode, and maintains electrical contact between the collected metal and the cathode, therefore minimizing metal loss to electrolyte due to undesired parasitic reactions.

Yet another object of the invention is to provide a system and method for harvesting metals from used nuclear fuel. A feature of the invention is a metal-collection vessel that is sized to limit the amount of metal collected at any one harvesting event and configured to minimize neutron levels within the collected metal and vessel. An advantage of the invention is that the collection vessel prevents the metal collected there from reaching a critical reaction state, thereby maximizing criticality safety of the system.

Briefly, the invention provides a system for collecting metal in an electrorefining process, the system comprising: a hollow cathode; and a container defining an upwardly extending surface adapted to be received by the hollow cathode.

Also provided is method for harvesting metal, the method comprising supplying a molten electrolyte liquor containing salts of the target metal; contacting the liquor with a cathode defining medially directed and laterally directed surfaces; and surrounding the medially directed surfaces and laterally directed surfaces with a container for collecting the metal forming on the cathode.

The invention further provides a metal electrorefining process comprising: subjecting molten salt containing metal moieties to electrolysis wherein reduced metal accumulates in a cathode-cup construct in a first step or position; raising the construct in a second step to a second position above the molten salt while subjecting the construct to heat from the molten salt; withdrawing the cathode from the construct in a third step maintaining the cathode and the cup in a third position within a vestibule to the electrorefiner; and in a fourth step removing the cathode from the vestibule while maintaining the cup within the vestibule in a fourth position.

BRIEF DESCRIPTION OF DRAWING

The invention together with the above and other objects and advantages will be best understood from the following detailed description of the preferred embodiment of the invention shown in the accompanying drawings, wherein:

FIG. 4 is a detail view of a cathode handling configuration, in accordance with features of the present invention;

DETAILED DESCRIPTION OF THE INVENTION

The foregoing summary, as well as the following detailed description of certain embodiments of the present invention, will be better understood when read in conjunction with the appended drawings.

All numeric values are herein assumed to be modified by the term "about", whether or not explicitly indicated. The term "about" generally refers to a range of numbers that one of skill in the art would consider equivalent to the recited value (e.g., having the same function or result). In many instances, the terms "about" may include numbers that are rounded to the nearest significant figure.

The recitation of numerical ranges by endpoints includes all numbers within that range (e.g. 1 to 5 includes 1, 1.5, 2, 2.75, 3, 3.80, 4, and 5).

The following detailed description should be read with reference to the drawings in which similar elements in different drawings are numbered the same. The drawings, which are not necessarily to scale, depict illustrative embodiments and are not intended to limit the scope of the invention.

As used herein, an element or step recited in the singular and preceded with the word "a" or "an" should be understood as not excluding plural said elements or steps, unless such exclusion is explicitly stated. As used in this specification and the appended claims, the term "or" is generally employed in its sense including "and/or" unless the content clearly dictates otherwise.

Furthermore, references to "one embodiment" of the present invention are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

The invented system and method facilitates collection of co-deposited metallic uranium and transuranic element (U/TRU) product in electrorefining processes. The system includes a uniquely configured cup to collect reduced metal as the latter is plated onto the cathode. The cup is adapted to slidably communicate with interior aspects of the cathode such that the cup encircles depending surfaces and longitudinally extending surfaces of the cathode. Other aspects of the system include a plurality of heat shields to minimize heat loss from the system during replacement of the cathode and during withdrawal of the cathode from the collection cup.

Figure 1A:
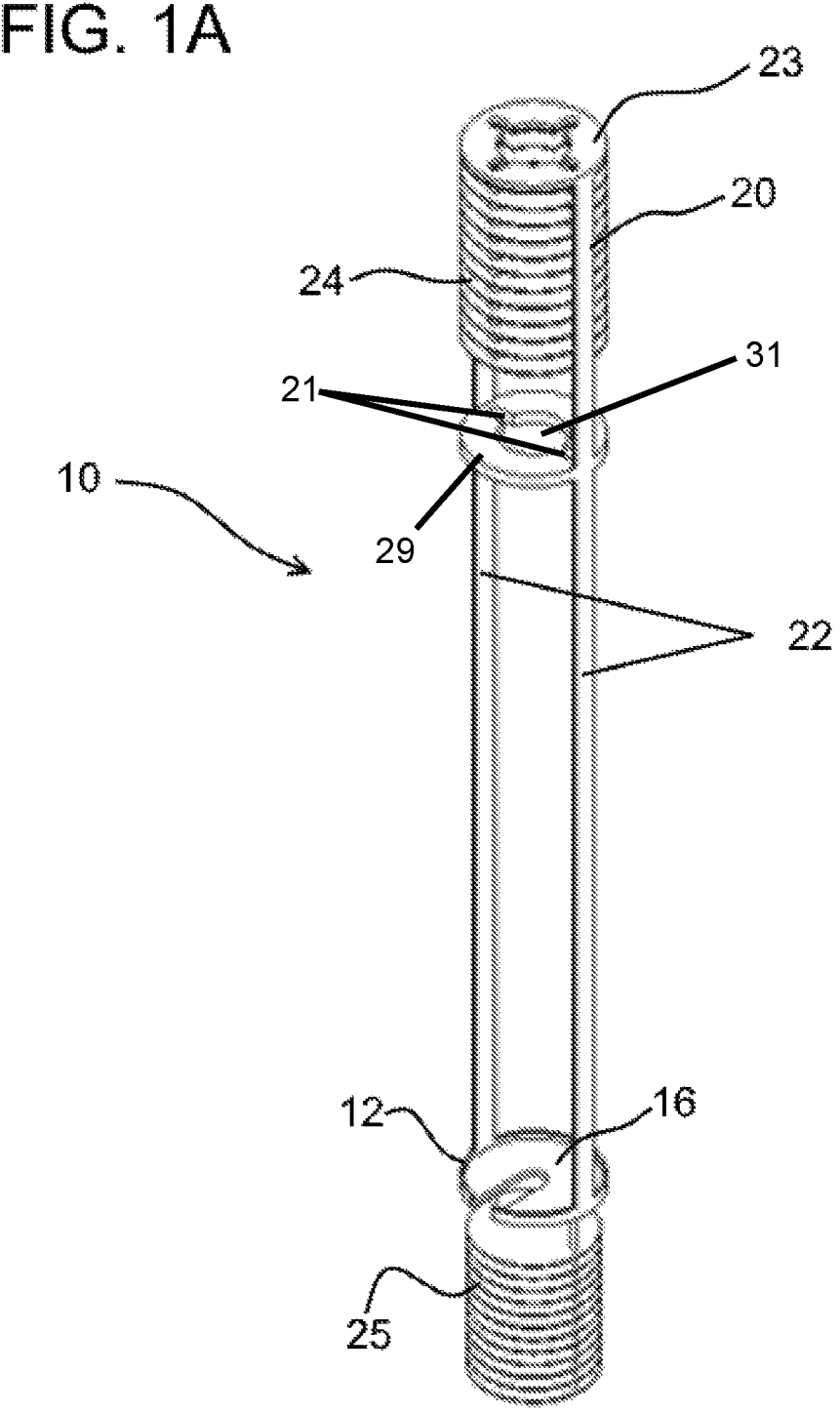
FIGS. 1A-E depicts a metal-collection system in various stages of use, in accordance with features of the present invention.

FIG. 1A depicts a metal harvesting collection system designated as numeral 10. The system 10 is designed to interact with a cabinet assembly 11 (depicted in FIGS. 5A-C) which serves as the semi-permanently mounted roof section of the electrorefiner. The cabinet 11 is a vestibule to the entry ports into the electrorefiner. The vestibule keeps heat from escaping to the ambient environment, and conversely, maintains components withdrawn from the refiner at above salt solidification temperatures. Thus, the vestibule keeps the components from cooling off too quickly before their further processing. Throughout this specification, "cabinet" and "vestibule" may be used interchangeably.

Generally elongate in configuration, the system 10 comprises a first or depending end 12 and a second end 20 positioned superior to the first end 12. As depicted in FIGS. 1B-1E, a cathode 14 is collinearly arranged with the elongated configuration so as to be slidably received by the second end 20. The cathode may be one continuous tube or a plurality of tubes, collinearly, coaxially joined. A myriad of means (element 43 in FIG. 1D) for coaxially joining the tubes are commercially available, including snap fit, spring clip, male-female thread configurations, and combinations thereof. This joining means 43 is positioned from the distal or depending end of the cathode tube at a distance greater than the length of the cup center post 38.

The first end 12 is adapted to removably receive a metal recovery cup 18. As such, the first end 12 terminates in a metal recovery cup support plate 16 that is generally horizontally disposed. The cup support plate 16 defines a notch 15 extending from the periphery of the plate to the center of the plate, and is adapted to receive vertically disposed aspects of a cup pedestal 17, described infra.

The second end 20 of the collection system is superior from the first end 12 and connected thereto via a plurality of longitudinally extending struts 22, such that the struts are vertically disposed. The struts 22 are positioned along the periphery of the system such that the struts are parallel both with each other and with the longitudinal axis of the system 10. The struts 22 are radially spaced, relative to each other and to allow access to interior aspects of the system, such as the recovery cup 18. The spacing of the struts from each other provide a means for guiding the cup in and out of the interior aspects of the system.

The upwardly extending ends of the struts terminate in a horizontally disposed plate 23 such that the upwardly extending ends of the struts 22 are attached thereto. Depending ends of the struts are mounted to the similarly disposed cup support plate 16. Therefore, the attachment of the ends of the struts to the plate 23 and the cup support plate 16 maintain the positioning of the struts in relationship to each other.

Both the first end 12 and second end 20 of the system terminate in a superior heat shield 24 and an inferior heat shield 25, respectively. The heat shields minimize heat flow out of the electrorefiner when the cathode is replaced or withdrawn from the electrolyte bath. FIG. 1A depicts the shield 24 positioned beneath the strut positioning plate 23.

Figure 1B:
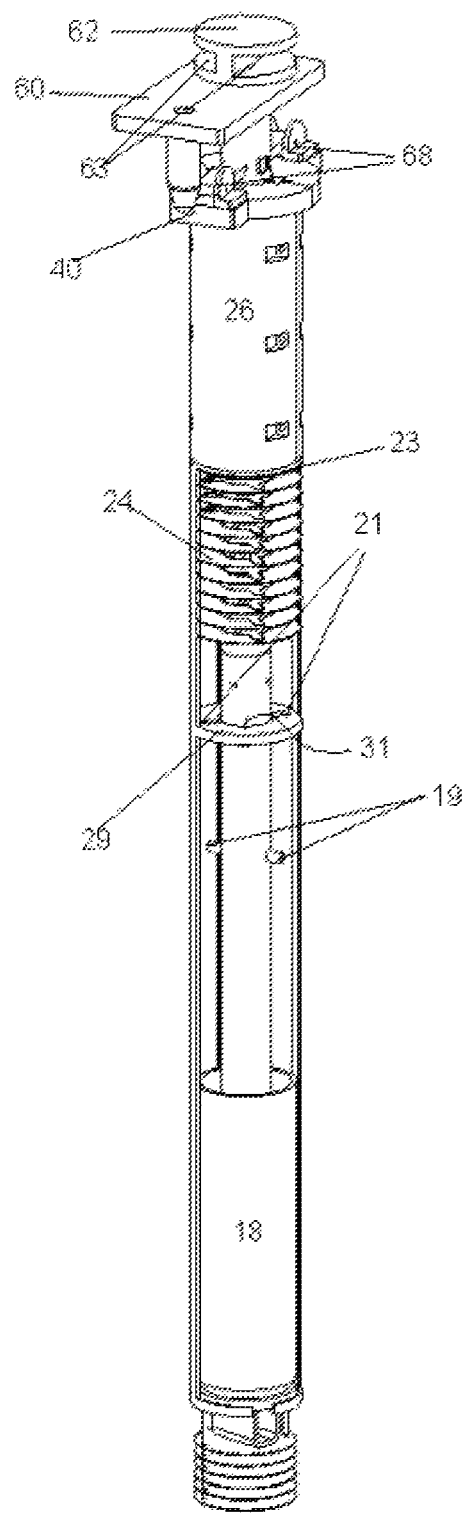

The second (i.e., superior) end 20 of the assembly 10 is adapted to removably receive an insulator plug 26, such that the assembly 10 is mounted to a downwardly facing surface of the plug 26. The plug 26 is annular in shape so as to define a central shaft or longitudinally extending aperture 32 to slidably receive the cathode 14. Inferior aspects (e.g., depending regions) and circumferential regions of the plug 26 are configured to reversibly latch, couple with, frictionally engage or otherwise mate with the cup holder assembly 10. FIG. 1B shows the plug 26 positioned above the first superior heat shield 24, with the strut plate 29 positioned between the plug 26 and the shield 24.

Figure 1C:
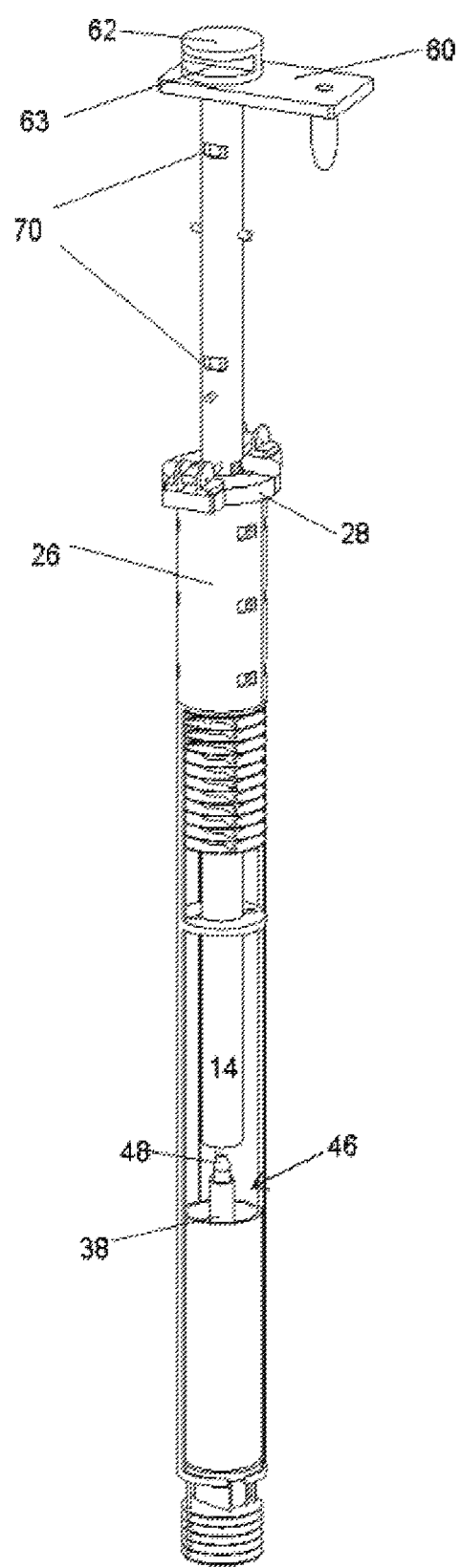

As depicted in FIGS. 1B and 1C, an upwardly ending end of the plug 26 supports a lift block 62 for moving the entire module by an overhead handling system (not shown). Specifically, circumferentially extending regions of a superior aspect of the plug 26 define a radially extending lip 28 such that the lip 28 cantilevers over longitudinally extending walls of the plug. Diametrically opposed regions of the lip define lateral projections 40, each projection 40 adapted to support two hinged levers 68.

The hinged lever 68 (a detailed depiction of which is in FIG. 4) engages longitudinally extending regions of the cathode via horizontally disposed notches 70 along those regions. As shown in greater detail in FIG. 4, the lever 68 comprises a tongue 72 with a proximal end 74 in rotatable communication with an axle-hub construct 76. A distal end 78 of the tongue 72 terminates in an edge adapted to be received in one of the aforementioned notches 70. As such, the cross sectional topography of the distal end 78 is dimensioned slightly smaller than the cross section topography of the notch 70 into which the distal end nests. The axle-hub construct 76 is mounted such that the tongue 72 extends medially at approximately a right angle to the longitudinal axis a of the system. (Several pairs of tongue/axle-hub constructs are positioned along the longitudinal lifting path of the system 10. Each of these construct pairs may engage pairs of notches 70 spaced along longitudinally extending surfaces of the cathode to provide different vertical positioning points for the assembly during withdrawal or insertion into the electro refiner. For example, each pair of notches can define an engagement point with two tongues coplanarly arranged to each other. Given two notches for two tongues, three pairs of notches facilitate serial engagement with three pairs of tongues.)

The axle-hub construct is not involved in supporting the assembly 10 on the bottom of the cabinet. Rather, when the assembly 10 is fully engaged within the salt bath (see FIG. 5A), it rests on the bottom of the cabinet 11 via downwardly facing surfaces of the radially extending regions 40. The weight of the system allows it to remain in position within the salt bath.

The lift block 62 is configured to reversibly receive mechanical jaws, pinchers, forks etc. As such, circumferential aspects of the block 62 may define grooves 63 extending through the block as a plurality of chords located at diametrically opposed regions of the block. FIG. 1C and FIG. 4 show the lift block 62 positioned at the end of the cathode tube 14. Positioned between the block and tube is an electrical conductor plate 60, discussed supra.

Figures 1D, 1E:
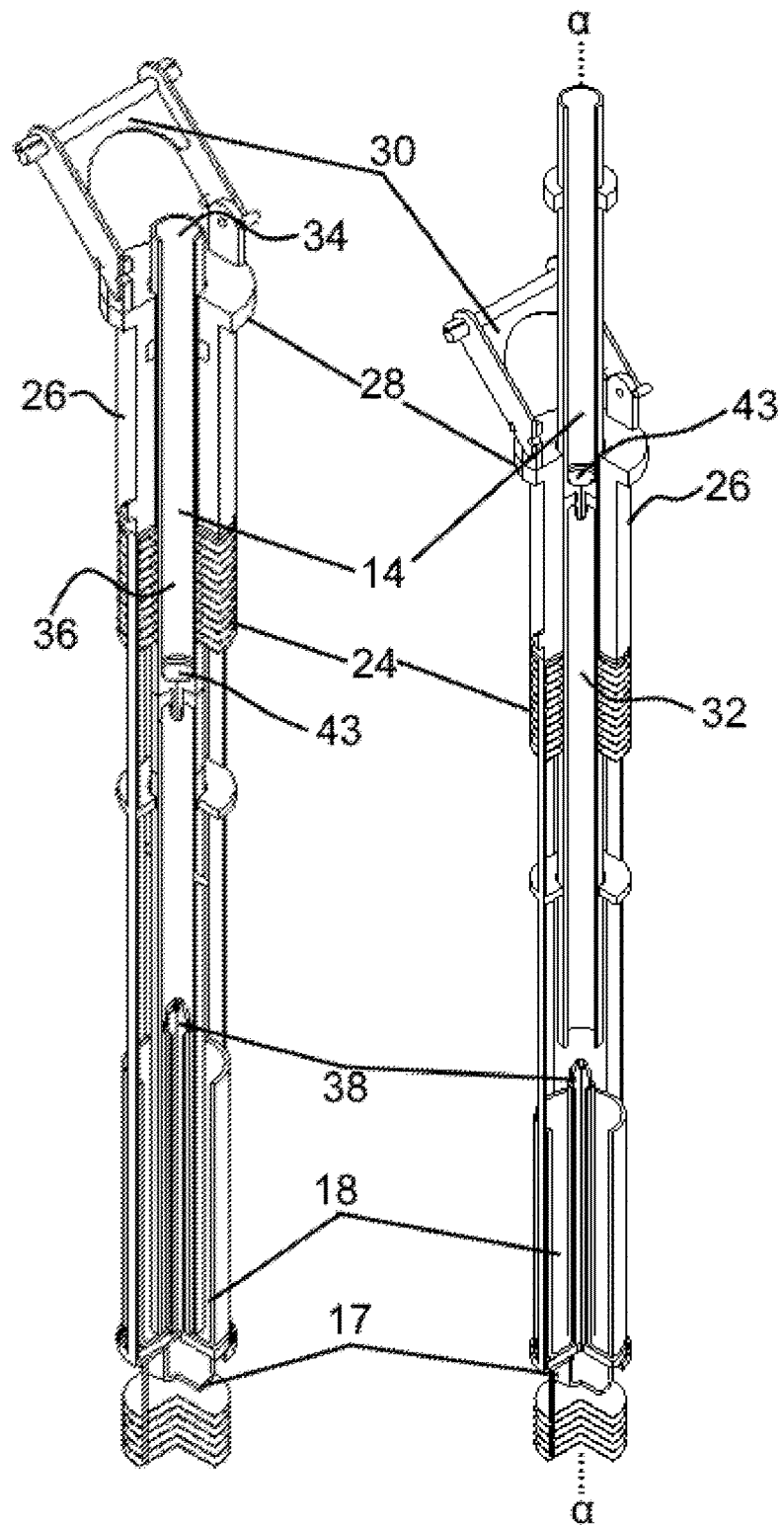

FIGS. 1D and 1E depict an alternative means for manipulating the assembly 10. Diametrically opposed regions of the lip are in pivotal communication with a loop, latch, or similar handle configuration 30. This handle 30 is provided to facilitate manipulation of the plug by an overhead handling system such as a crane, pick, remote arm, etc. The handle configuration depicted in FIGS. 1D and 1E is an upside down "U" such that the ends of the "U" are each pivotally mounted to the lip regions. The "U" shape facilitates a straight vertical lift, thereby assuring that all devices are centered during insertion and removal.

Cathode/Cup Detail

The cathode 14 comprises a first upwardly extending end 34 and a depending or downwardly extending end 36. The first end 34 mates with a bus bar adapter or a electrical conductor plate 60 so as to cause the cathode to become electrically charged. The second end 36 is configured as a tube to slidably receive regions of the metal collection cup 18.

The bottom or floor of the metal collection cup defines an annular space having a predetermined volume. The volume is calculated to prevent an over abundance of metal from collecting, which would otherwise lead to critical reactions occurring. An upwardly extending region 38 of the floor, reminiscent of a post, is coaxial with the longitudinal axis of the cup. This upward extension conforms the interior space of the cup to an annular shaped void with the post at its center. This upwardly extending region 38 also siphons, collects or otherwise diverts neutrons from the metal forming on the cathode and accumulating in the cup. This neutron diversion feature further enhances criticality safety.

Figure 2A:
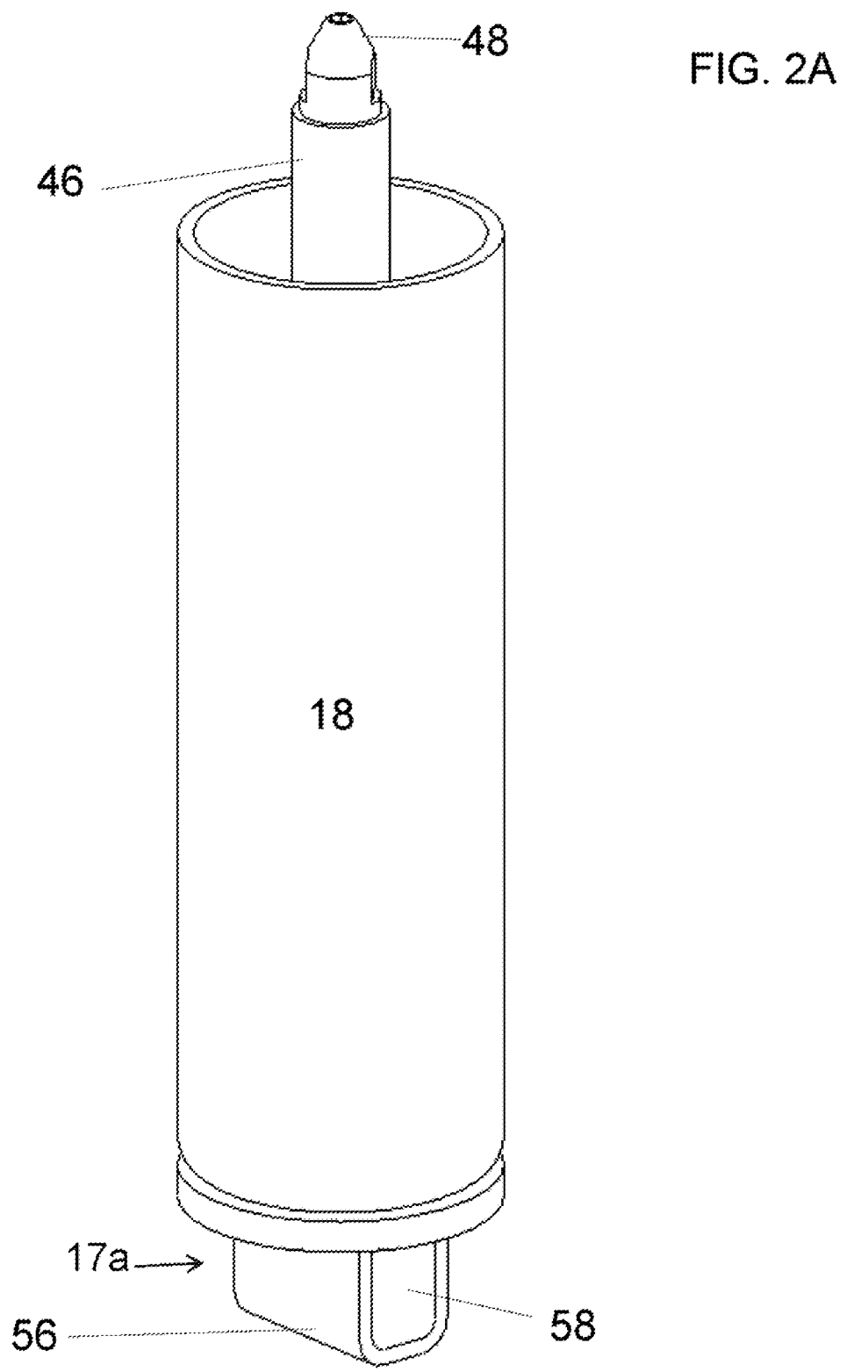
FIG. 2A is an elevational view of a metal-collection cup, in accordance with features of the present invention.
Figure 2B:
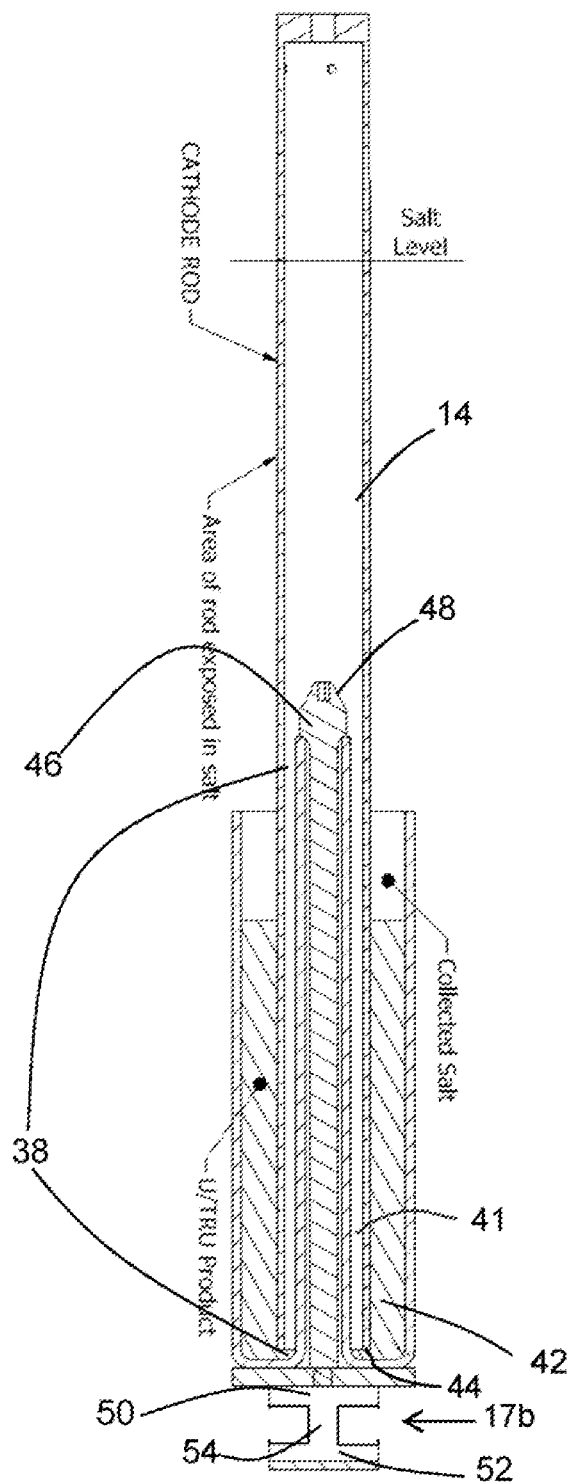
FIG. 2B is a cutaway, elevational view of a collection cup juxtaposed to a cathode, in accordance with features of the present invention.
Figure 3:
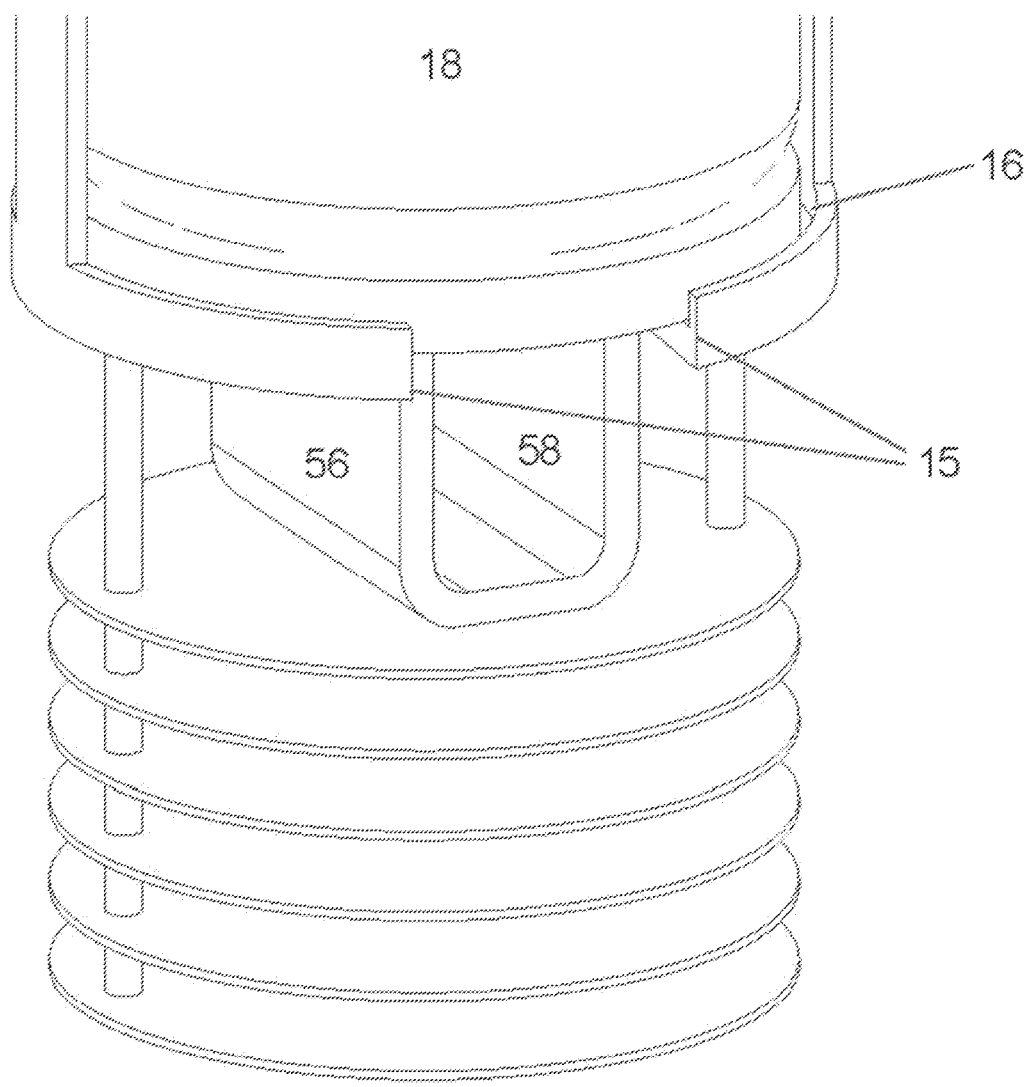
FIG. 3 is a view of an alternative cup manipulation configuration, in accordance with features of the present invention.

FIGS. 2A, 2B and 3 depict two different configurations for manipulating the recovery cup 18. One embodiment depicted in FIG. 2A depicts a first configuration 17a for a cup pedestal. This configuration comprises a depending construct 56 defining a channel 58. The construct is configured as a "U" with its two ends attached to the downward facing surface of the cup 18. The construct 56 is dimensioned so as to be slidably received by the notch 15 of the cup support plate 16 so as to reside below the plane formed by the plate 16. The channel 58 may be closed at its bottom portion (as shown) or open. The channel is adapted to receive a mechanical grabbing means such as a boss, pinchers, or expanders. The channel may be configured as a threaded female aperture to receive a similarly dimensioned threaded rod.

FIG. 2B depicts an alternative configuration 17b for the cup pedestal. In this embodiment, the depending or downwardly facing end of the cup terminates in pedestal structure resembling a spool. The spool 17 defines a first horizontally disposed substrate 50, a second horizontally disposed substrate 52 and a center axis 54 coaxial with the longitudinal axis of the assembly 10, the center axis 54 separating the first and second substrates, such that the first substrate 50 is positioned above the second substrate 52. The open sides defined by the spool configuration allows the longitudinal axis to be accessible from lateral aspects of the pedestal. As such, the open sides allow for initial engagement with a pincher or fork having a breadth or spread wider than the diameter of the substrates 50 or 52.

The cup 18 is supported on an upwardly facing surface of the first substrate 50. In an embodiment of the invention, the cup 18 is removably attached to the upwardly facing surface of the first substrate. In another embodiment of the invention, the cup is permanently attached to the upwardly facing surface of the first substrate 50 of the pedestal 17.

The cross section of the center axis 54 of the pedestal 17 is dimensioned to be slidably received by the notch 15 formed in the cup support plate, that notch so depicted in FIG. 3. Once so nested, the support plate resides between the first and second substrates of the pedestal 17. In other words, once the pedestal is slid into position, it sandwiches the support plate 16 between its two horizontally disposed substrates 50, 52.

The first and second substrates are spaced apart so as to facilitate grabbing of the axis 54 with a tool (not shown), once the pedestal/cup construct is fully extracted from the confines of the electrorefiner. The pedestal configuration assures that the tool will securely fasten onto the pedestal and allow the pedestal to be upended when cup emptying procedures commence.

As depicted in FIG. 1B and FIG. 2, when the cathode 14 is in a fully extended configuration, it completely envelopes the aforementioned upwardly extending region 38 of the cup 18. As such, the depending end of the cathode is positioned in close spatial relation to the floor of the cup when the cathode is fully extended downwardly. In this fully nested position, two annular spaces 41, 42 are created in which reprocessed metal may accumulate. The first annular space 41 (FIG. 2b) is defined by medially facing surfaces of the cathode tube 14 (i.e., interior surfaces of the cathode tube) and laterally facing surfaces of the upwardly extending region 38 of the cup. The second annular space 42 is defined by laterally facing surfaces (i.e., exterior surfaces) of the cathode tube 14 and medially facing surfaces of the peripheral walls of the cup.

An embodiment of the invention prevents metal from remaining in an annular space 42. Otherwise, large amounts of metal accumulation there may stymie easy removal of the cathode from the extending region 38 of the cup 18 at the end of a collection cycle. One way for preventing metal accumulation within the first annular space 41 is to position the depending end 44 of the cathode to be above the floor of the cup a distance which facilitates liquid drainage from that annular space 41.

In another embodiment of the invention, the lip of the depending end 44 of the fully extended cathode 14 is sufficiently offset radially from opposing surfaces of the upwardly extending region 38 or post of the cup so as not to hinder drainage of reduced metal formed on the interior of the cathode from seeking the level of the metal in the cup forming during electrolysis. This configuration increases the efficiency of the cathode inasmuch as it facilitates metal formation and collection on medially facing surfaces and laterally facings surfaces of the cathode viz. the collection cup. Therefore, this configuration provides two annular spaces in which metal formation occurs, both of the annular spaces confined to the same collection cup.

Alternatively, the medially facing surfaces of the cathode tube can be coated with a non-conductive film to prevent deposition of material on that surface. This non-conductive film may provide a means for preventing the tube from freezing or otherwise sticking to the cup.

Operational Detail

Figure 5A:
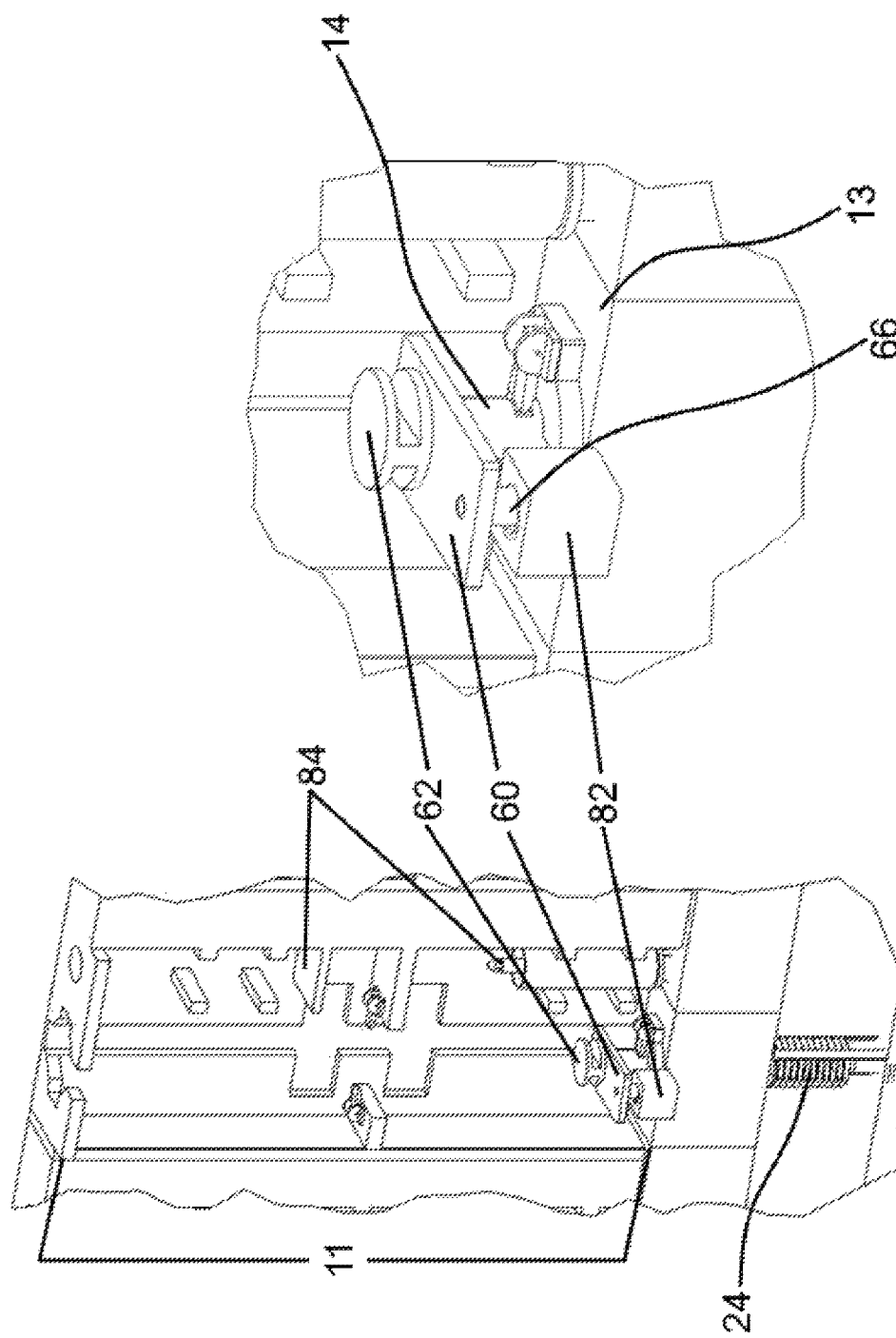
FIGS. 5A-E are sequential views of the system in various states of deployment in an electrorefiner, in accordance with features of the present invention.

In full operational mode, the system and therefore the cathode is fully inserted into the electro-refiner as shown in FIG. 5A, with the cup immersed within molten electrolyte, and the cathode fully extended into the molten electrolyte. The upwardly extending end 34 of the cathode 14 is in electrical communication with an electrical supply block 82 positioned on the floor 13 of the cabinet 11 as depicted in FIG. 5A.

FIGS. 4 and 5A depict the upwardly extending (i.e., superior) end 34 of the system in electrical communication with a proximal end of the electrical conductor plate 60 attached to the floor 13 of the cabinet 11 via an electrically charged pin or post 66. These figures show the system fully inserted into the electrorefiner, which lies below the floor 13 of the cabinet 11.

The plate 60 is positioned between the end of the rod 14 and the lift block 62, the latter of which provides a means for gripping the cathode rod 14 to facilitate cathode lowering and raising operations. The lift block 62 may define a threaded aperture 64 so as to mate with the upwardly extending end 34 of the cathode, which terminates in a threaded rod. A transverse aperture may be provided in the plate such that the aperture is collinear with the aforementioned threaded aperture of the lift block and the end 34 of the cathode.

A distal end of the plate is in electrical communication with an electrical contact pin 66 so as to facilitate quick connect-disconnect of the system 10 to the electrical supply block 82. The pin 66 depends from a bottom facing surface of the plate so that electrical disconnect occurs when the system is pulled upwardly, and out of the electrolytic bath.

During this phase of the electrorefining process (i.e., where the system is fully inserted into the electrorefiner), metal collecting on the cathode clones off of it almost immediately due to gravity, and comes to rest within the confines of the recovery cup 18. Metal plating occurs along the entire length of the cathode 14 and not just on that portion of the cathode directly overlying the recovery cup. As the cup fills with metal, it displaces the electrolyte residing therein.

Extraction Sequence Detail

The cathode extraction sequence for the system 10 is multi-fold inasmuch as the cathode rod 14 is first partially withdrawn, then the entire assembly 10 is partially withdrawn. A salient feature of this sequence is that it minimizes heat loss from the crucible to the ambient environment, and even to the interior of the semi permanent cabinet 11, which serves as a vestibule to the electrorefiner proper.

Cathode movement within the system is facilitated with the aforedescribed tongue and groove interlocking mechanism, such that the tongue, mounted to the system, mates with the grooves formed in longitudinally extending regions of the cathode, which itself is in slidable communication with the system. Similar tongue and groove arrangements allow for sequential, step-wise withdrawal of the entire system 10 from the confines of the electrorefiner. When the system 10 is fully engaged (FIG. 5A), it is supported at the floor 13 of the cabinet 11 by the radially extending cantilevered regions 40 of the plug 26.

When the system 10 is partially extracted from the electrorefiner (FIGS. 5B, 5C), downwardly facing surfaces of the radially extending cantilevered regions 40 again support the system 10. In this instance, the cantilevered regions 40 contact either medially directed shelves 87 or other similarly situated structures within the cabinet, or with upwardly facing surfaces of the aforementioned tongues 72, which project from the distal ends of such shelves or structures. This partial system 10 extraction position allows any salt or metal to drip off the cup, while still relegating the cup to the heated confines of the electrorefiner.

When the system 10 is completely withdrawn from the electrorefiner (FIG. 5D), the system is again supported by the radially extending cantilevered regions 40 of the plug 26, but this time those regions are supported by the roof of the cabinet 11. This complete withdrawal, such as depicted, allows for the removal of the currently used metal collection cup after the cathode 14 is extracted upwardly, as described infra.

First Extraction Step Detail

The system 10 is shown in FIG. 5A as fully deployed within the salt bath. The cathode 14 is shown as locked into that position via the tongue 72 and groove mechanism described supra, wherein the relatively stationary tongue (anchored to the floor of the cabinet 11) is nested within the superior notch 70 formed within the cathode 14.

Upon completion of the electrorefining process, and starting at a position depicted in FIGS. 1B and 5A, an overhead system with an end attachment means such as a hook, clamps or pinchers, engages the cathode lift block 62 and raises the cathode until a radially extending boss 19 or other protuberance from the cathode engages or otherwise contacts the downwardly depending surface of a scraper/guide plate 29. The scrapper/guide plate 29 is depicted in FIGS. 1A and 1B as residing above the surface of the salt bath. The superior heat shield 24 is also seen residing above the surface of the salt bath and fully nested within the floor 13 of the cabinet 11.

Figure 5B:
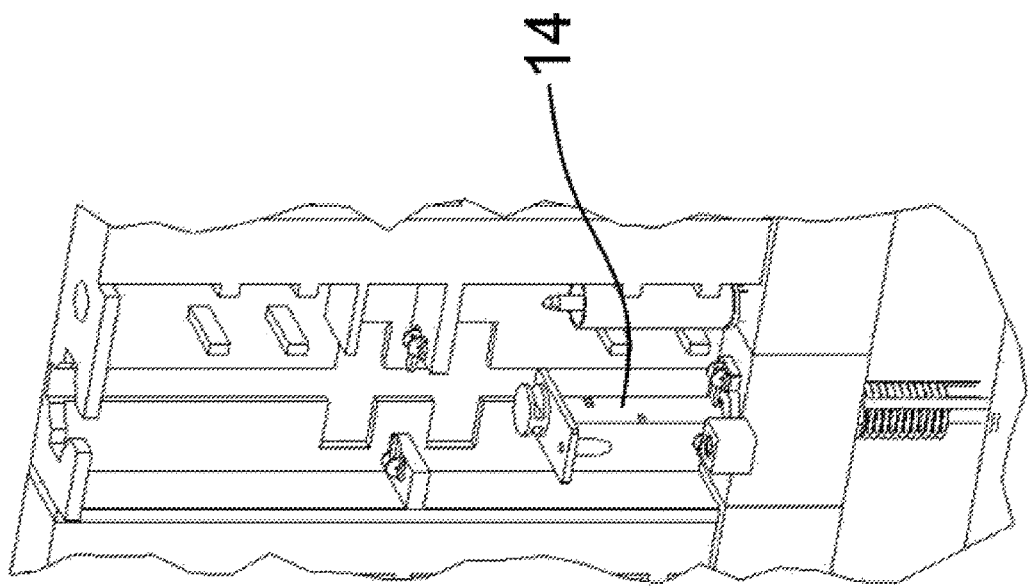

This first extraction step is illustrated in FIG. 5B. Movement occurs up to the point of protuberance 19 engagement with the scraper/guide plate 29, and causes the cathode to slide upwardly and through a central aperture 31 of the scraper/guide plate 29. The protuberance engagement with the downwardly facing surface of the scraper/guide plate 29 provides a tactile cue to the operator that the first height of the cathode extraction has been reached. This protuberance engagement limits movement of the cathode guide tube a predetermined distance. This predetermined distance is sufficient to disconnect power to the cathode, while still allowing the depending end of the cathode 14 to be engaged in the cup post 38, so as to confer stability to the depending end of the cathode. In an embodiment of the invention, this first lifting distance is approximately 13 inches.

At this engagement point, a second set of cathode notches 70, seen in FIG. 1C as inferior to the most superior notch, engages with the tongue 72 anchored to the floor 13 of the cabinet.

This initial cathode retraction automatically decouples the electrical connection between the cabinet and the cathode 14.

Second Extraction
Step Detail

Figure 5C:
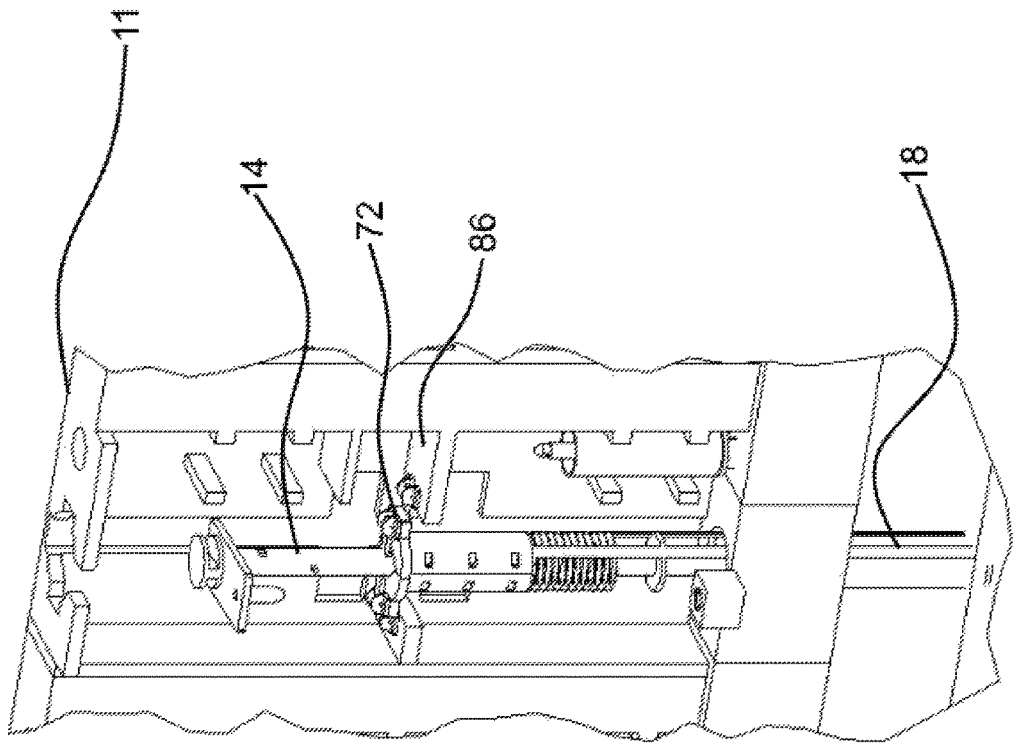

In a second extraction step, depicted in FIG. 5C, the entire assembly 10 is lifted upwardly, such that the cathode and the system move in tandem. This tandem lift is facilitated by the protuberances 19 of the cathode still engaging the underside of the scraper/guide plate 29. The entire assembly comes to rest at a second, superior set of tongues 72 which are anchored within the cabinet and approximately midway along the vertical axis of the cabinet at a mid level support structure 86 of the cabinet 11.

This second extraction configuration allows the exterior surfaces of the cup 18 to drip dry inasmuch as the cup is no longer in contact with the salt bath. However, the cup 18 remains within the headspace of the electrorefiner so as to stay relatively warm. This will facilitate drainage of salt from the cup 18 while minimizing the risk of salt freezing on the cup.

Third Extraction
Step "Detail

Figure 5D:
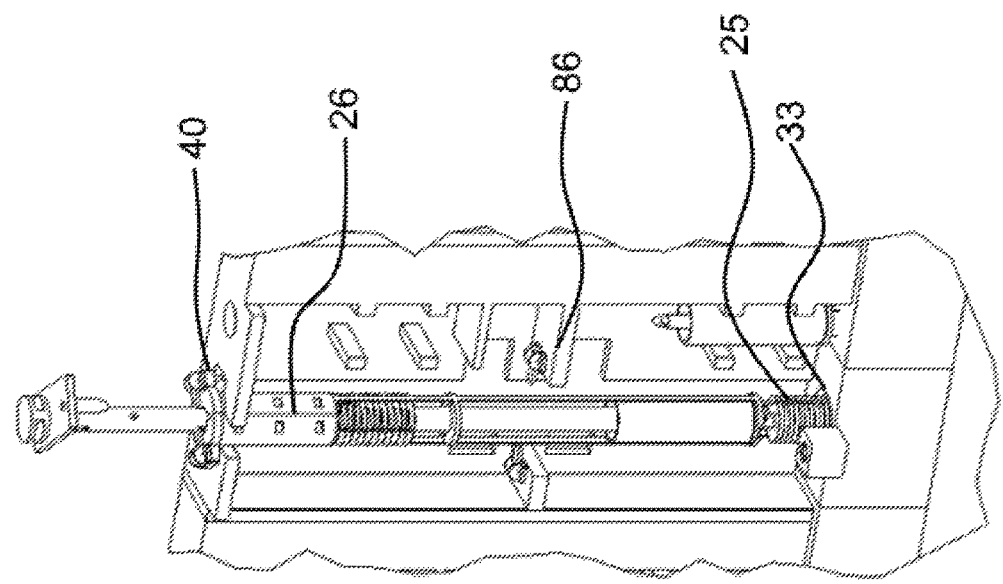

The system 10 is further retracted from the refiner as depicted in FIG. 5D. Retraction of the system 10 is facilitated by aligning the radially extending cantilevered regions 40 of the plug 26 with mating apertures formed within the roof of the cabinet 11. Then the system is lifted such that the superior end of the plug 26 is lifted above the cabinet 11, rotated along an arc angle sufficient to take the cantilevered regions out of alignment with the mating apertures, and lowered such that the system rests on the roof of the cabinet. FIG. 5D depicts the system rotated approximately 45 degrees.

Upon the completion of this third extraction step, the cathode 14 is still engaged with the superior tip 48 of the cup post 38. Also, the second, inferior heat shield 25 is nested within the aperture 33 formed in the floor of the cabinet 11. (The aperture 33 provides a means of ingress and egress of the assembly 10 in and out of the confines of the electrorefiner.) Such nesting of the inferior heat shield 25 provides a means for preventing heat loss from the head space above the bath into the cabinet/vestibule interior.

Fourth Extraction
Step Detail

Figure 5E:
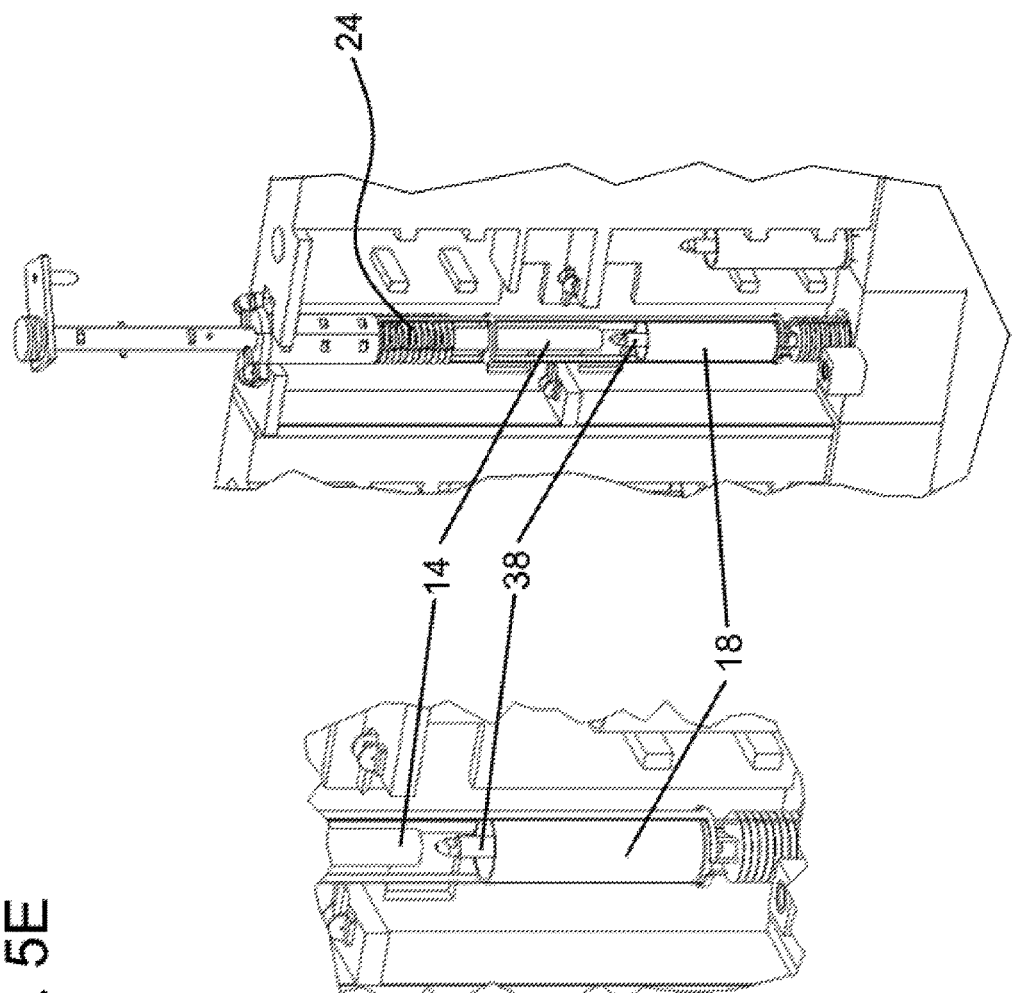

FIG. 5E shows the system after a fourth extraction step. This fourth step is initiated when the cathode rod 14 is rotated about 90 degrees until its protuberances 19 align with diametrically opposing notches 21 (see FIG. 1B) positioned along the central aperture 31 of the scraping/aligning plate 29. Then, while the system is kept in contact with the roof of the cabinet 11, the cathode 14 is raised to allow passage of the protuberances through the notches and similarly aligned notches along the central aperture of the first, superior heat shield 24. This raising action may result in any residual material being scraped from the cathode 14. This raising action also results in disengagement of the cathode 14 from the center post 38 of the cup 18.

As the cathode tube is raised past the notches in plate 29, a third set of notches identical to item 70 come into view and allow the cathode system to be positioned in stationary position above the collection cup. The third set of notches in item 70 engage the hinged lever, 68 and 72-78, to position the cathode above the cup. The notches are not visible in the drawings because they are hidden by the heat shield, 24, and insulation, 26.

Travel of the cathode is approximately 7 inches before the third set of notches engage the hinged lever FIGS. 5A-C depicts other aspects of the interior of the cabinet 11, including a plurality of storage areas 19 for placement of additional metal recovery cups 18. Two such storage areas 84 are depicted as arranged on the same side of the cathode system 10, with one storage area arranged beneath the other. However, other configurations may be suitable.

The overhead handling system, utilizing the same grasping means as was used to grasp the lift block 62, is used to grasp the pedestal engagement portion 54 in FIG. 2, or element 56 in FIG. 3, and place it in a superior positioned cup storage space 84 in the cabinet. The handling system then harvests an empty cup, on its own pedestal from the lower storage shelf 84 and installs it in the module 10.

Inasmuch as the molten electrolyte and metals will approach 650° C., suitable materials are selected to withstand reaction temperatures. For example, suitable materials for the cup 18 are any nonelectrically conductive substrate, such as ceramic. Cathode materials are electrically conductive materials selected from the group consisting of tungsten, molybdenum, tantalum, and combinations thereof.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. While the dimensions and types of materials described herein are intended to define the parameters of the invention, they are by no means limiting, but are instead exemplary embodiments. Many other embodiments will be apparent to those skilled in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the terms "comprising" and "wherein." Moreover, in the following claims, the terms "first," "second," and "third," are used merely as labels, and are not intended to impose numerical requirements on their objects. Further, the limitations of the following claims are not written in means-plus-function format and are not intended to be interpreted based on 35 U.S.C. § 112, sixth paragraph, unless and until such claim limitations expressly use the phrase "means for" followed by a statement of function void of further structure.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," "more than" and the like include the number recited and refer to ranges which can be subsequently broken down into subranges as discussed above. In the same manner, all ratios disclosed herein also include all subratios falling within the broader ratio.

One skilled in the art will also readily recognize that where members are grouped together in a common manner, such as in a Markush group, the present invention encompasses not only the entire group listed as a whole, but each member of the group individually and all possible subgroups of the main group. Accordingly, for all purposes, the present invention encompasses not only the main group, but also the main group absent one or more of the group members. The present invention also envisages the explicit exclusion of one or more of any of the group members in the claimed invention.

The embodiment of the invention in which an exclusive property or privilege is claimed is defined as follows:

1. A system for collecting metal in an electrorefining process, the system comprising:
   a. a hollow cathode; and
   b. a container defining an upwardly extending surface adapted to slidably communicate with interior aspects of the hollow cathode;
   wherein the container encircles the bottom and laterally facing surfaces of the cathode.

2. The system as recited in claim 1 wherein the extending surface is coaxial with the longitudinal axis of the container and of the cathode.

3. The system as recited in claim 1 wherein the cathode does not contact the container.

4. The system as recited in claim 1 wherein the cathode is not in electrical communication with the container.

5. The system as recited in claim 1 adapted to contain metal in two annular spaces between the cathode and the container.

6. The system as recited in claim 1 wherein the cathode and the container are adapted to be imbedded in molten salt in a first position.

7. The system as recited in claim 6 wherein the container is adapted to be imbedded in molten salt in a second position.

8. The system as recited in claim 1, wherein annular spaces defined between the cathode and the container are adapted to retain metal formed during the electrorefining process, while displacing an electrolyte out of the annular spaces.

9. A system for collecting metal in an electrorefining process, the system comprising:
   a. a rotatable, hollow cathode;
   b. a container defining an upwardly extending surface adapted to oppose interior surfaces of the hollow cathode;
   c. a first plate adapted to support the container;
   d. a second plate superior from the first plate and connected thereto via a plurality of vertically extending struts; and
   e. a cathode-scraper third plate disposed between the first plate and the second plate and attached to the struts, each of the first, second, and third plates defining a central aperture to slidably receive the cathode, wherein the cathode is collinearly aligned with the apertures of the first, second and third plates.

10. The system as recited in claim 9 further comprising:
    f) radially extending protuberances on the surface of the cathode; and
    g) diametrically opposed notches formed in the central aperture of the third plate, said notches in slidable communication with the protuberances upon rotation of the cathode.

11. The system as recited in claim 9 wherein the container defines a first annular region and a central protuberance coaxial with the annular region.

12. The system as recited in claim 11 wherein the cathode defines a tube adapted to receive the central protuberance of the container to define a second, inner annular region between the central protuberance and in the interior surfaces of the hollow cathode.

13. The system as recited in claim 12, wherein the first and second annular regions are adapted to retain metal formed during the electrorefining process, while displacing an electrolyte from the annular regions.

* * * * *